United States Patent Office 3,055,912
Patented Sept. 25, 1962

3,055,912
NEW SUBSTITUTED INDOLE-(2)-ALDEHYDES AND PROCESS FOR THEIR MANUFACTURE
Karl Hoffmann, Binningen, and Alberto Rossi and Jindrich Kebrle, Basel, Switzerland, assignors to Ciba Corporation, a corporation of Delaware
No Drawing. Filed Nov. 5, 1958, Ser. No. 771,953
Claims priority, application Switzerland Nov. 11, 1957
10 Claims. (Cl. 260—319)

This invention provides a new process for the manufacture of 1-substituted indole-(2)-aldehydes, especially indole-(2)-aldehydes aliphatically substituted in the 1-position, and more especially, those in which the aliphatic radical is an unsubstituted or substituted alkyl group containing 1–5 carbon atoms for example a methyl, ethyl or propyl group. The new compounds may contain further substituents, for example, further alkyl groups in the benzene nucleus. The alkyl groups in the new compounds may be substituted, for example, by amino, such as tertiary amino, and especially lower dialkylamino, groups, for example dimethyl and diethylamino groups, and/or aryl groups. The invention provides in particular 1-methylindole-(2)-aldehyde of the formula

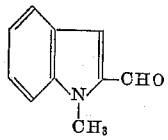

The new compounds are valuable intermediate products for the manufacture of medicaments. Thus, they may be reacted with O-(β-dialkylamino-ethoxy)-amines to form the corresponding O-substituted oximes, which may be quaternated in the usual manner, for example, with lower alkyl halides. These compounds afford protection against the effects of esterase inhibitors, and especially cholenesterase inhibitors, and they relieve poisoning caused by organo-phosphorus cholenesterase inhibitors, such as occur, for example, with insecticides.

The new aldehydes are obtained according to the invention by reacting a 1-substituted indole-(2)-lithium compound with an N-disubstituted formamide, for example N-di-lower alkyl, N-di-aryl, N-alkyl-N-aryl-formamide, for instance formyl-dimethylamine or formyl-diphenylamine, advantageously N-methyl-N-formyl-aniline, and treating the compound formed with a hydrolysing agent.

The aforesaid reaction and subsequent hydrolysis are carried out by methods in themselves known. Thus, for example, the usual inert diluents, such as ether, may be used, and the reaction product may be hydrolysed with water, a dilute inorganic acid or an aqueous solution of an acid salt.

When the new compounds contain basic groups, they are obtained in the form of the free bases or salts thereof depending on the reaction conditions used, and the bases may be converted into salts or the salts into the bases. As salts there may be mentioned, for example, those of hydrohalic acids, sulfuric acid, nitric acid, phosphoric acid, acetic acid, propionic acid, oxalic acid, tartaric acid, citric acid, benzoic acid, benzene sulfonic acids or alkyl sulfonic acids, such as methane or ethane sulfonic acid, etc.

The starting materials are known or can be made by methods in themselves known.

The following examples illustrate the invention:

*Example 1*

To a solution of 39.3 grams of 1-methyl-indole in 150 cc. of absolute ether are added in an atmosphere of nitrogen 250 cc. of a 1.4 N-solution of lithium n-butyl in absolute ether, and the whole is boiled under reflux for 3½ hours. The whole is cooled to 5° C., and a solution of 40.5 grams of N-methyl-N-formyl-aniline in 100 cc. of absolute ether is added dropwise while stirring.

After boiling the reaction solution for a further 3 hours under reflux, it is poured, while stirring, into a mixture of 300 cc. of 2 N-hydrochloric acid and 150 grams of ice.

A further 100 cc. of ether are added and the ethereal layer is separated from the aqueous layer in a separating funnel. The ethereal solution is washed three times with 50 cc. of ice-water each time, then dried over magnesium sulfate and evaporated in vacuo.

The residue is distilled in a high vacuum, whereby, in addition to a small amount of forerunnings consisting of 1-methyl-indole, 28 grams of pure 1-methyl-indole-(2)-aldehyde boiling at 90–95° C. under 0.02 mm. pressure are obtained.

The aldehyde crystallizes throughout and melts at 83–85° C. It can be converted in the following manner into an oxime affording protection from the effects of cholenesterase inhibitors.

A solution of 6.5 grams of β-dimethylamino-ethoxyamine and 10 grams of 1-methyl-indole-(2)-aldehyde in 40 cc. of absolute alcohol is boiled in an atmosphere of nitrogen for 8 hours under reflux. The greater part of the alcohol is evaporated under 11 mm. pressure and the residue is distilled in a high vacuum, whereby O-(β-dimethylamino-ethyl)-1-methyl-indole-(2)-aldoxime of the formula

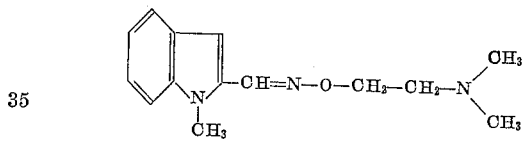

is obtained in the form of a thickly liquid colorless oil boiling at 140° C. under 0.02 mm. pressure. Upon standing the oil solidifies in a short time and melts at about 39–40° C.

4.8 grams of O-(β-dimethylamino-ethyl)-1-methylindole-(2)-aldoxime are dissolved in 15 cc. of ethyl acetate, 3 grams of methyl iodide are added to the solution, and the whole is allowed to stand at room temperature, whereupon a copious white precipitate is formed.

By recrystallizing the precipitate from methanol there is obtained O-(β-trimethylammonium-ethyl)-1-methylindole-(2)-aldoxime iodide in the form of white crystals melting at 232–234° C.

The aldehyde can be converted into its thio-semicarbazone as follows:

To a solution of 1.24 grams of 1-methyl-indole-(2)-aldehyde in 10 cc. of alcohol are added one drop of glacial acetic acid and a warm solution of 0.8 gram of thio-semicarbazide in 10 cc. of water. The whole is heated on a water bath for 15 minutes and, after cooling the mixture, the thio-semi-carbazone separates out in the form of yellow crystals, which melt at 194–195° C. after recrystallization once from a mixture of ethanol and water.

*Example 2*

To a solution of 10 grams of 1-methyl-3-dimethylaminomethyl-indole in 50 cc. of absolute ether are added in an atmosphere of nitrogen 55 cc. of a 1.2 N-solution of lithium n-butyl in absolute ether, and the whole is boiled under reflux for 3 hours. The mixture is then cooled to 0° C., a solution of 8.6 grams of N-methyl-N-formyl-aniline in 30 cc. of absolute ether is added dropwise while stirring, and the mixture is boiled for 3 hours under reflux.

After allowing the reaction solution to stand for 16 hours at room temperature, it is poured into 100 grams of ice while stirring. The ethereal layer is separated in a separating funnel, and is extracted each time with 30 cc. of 2 N-hydrochloric acid, the aqueous hydrochloric acid layer is rendered alkaline with a 2 N-solution of caustic soda with the addition of ice, and the oil which separates out is taken up in 100 cc. of ether. The ethereal solution is then washed with distilled water, dried over magnesium sulfate, and evaporated in vacuo.

The residue is distilled in a high vacuum whereby, in addition to forerunnings consisting of N-methyl-aniline and 1-methyl-3-dimethylaminomethyl-indole, there are obtained 9 grams of 1-methyl-3-dimethylaminomethyl-indole-(2)aldehyde boiling at 135–140° C. under 0.01 mm. pressure in the form of a thickly liquid slightly brown oil.

By adding to a solution of the above aldehyde in ethanol the calculated quantity of hydrochloric acid in ethyl acetate, the hydrochloride is obtained which melts with decomposition at 238–239° C. after recrystallization once from methanol.

The aldehyde of Example 1 can be used for the synthesis of valuable products, for example, for the production of β-carbolines. This synthesis is carried out, for example, in the following manner.

1 - methyl-2 - [N-(β-diethoxyethyl)-imino-methyl]-indole:

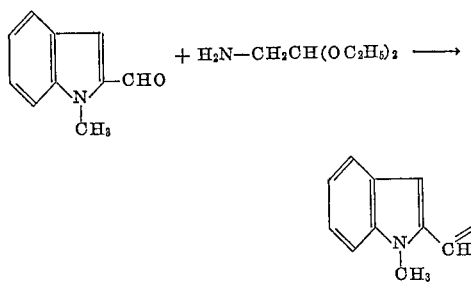

A solution of 15.9 grams of 1-methyl-2-formyl-indole and 13.9 grams of amino-acetal in 50 ml. of benzene free from thiophene is boiled under reflux and with the use of a water separator until 1.8 ml. of water have been removed. The benzene is then evaporated and the residue is crystallized from a mixture of ether and petroleum ether. It melts at 63° C.

[(N - methyl - indolyl) - methyl]-(β-diethoxyethyl)-amine:

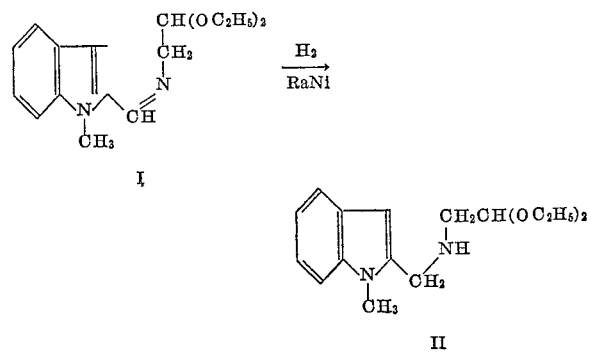

2.77 grams of the Schiff's base I are hydrogenated in 30 ml. of alcohol with catalytically activated hydrogen (advantageously with a Raney nickel catalyst) at room temperature and under atmospheric pressure until the calculated quantity of hydrogen, namely 224 ml. has been taken up. After removing the alcohol, the hydrogenation product is purified by distillation at 120° C. under 0.02 Torr.

9-methyl-β-carboline and 9-methyl-1:2:3:4-tetrahydro-β-carboline:

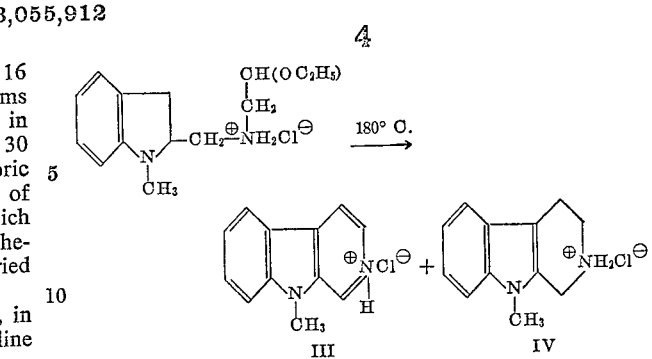

4.85 grams of the hydrochloride of the compound of the Formula II are suspended in 60 ml. of tetraline and heated at 180° C. for 5 minutes while stirring. The onset of the reaction can be recognised by the foaming and yellow coloration of the solution.

The cooled reaction mixture is extracted with water and the aqueous extract is rendered alkaline and extracted with ether. The ethereal extract is dried and evaporated. The residue consists of a mixture of equal parts of the bases of compounds III and IV, which can be separated from one another by fractional crystallization of their hydrochlorides. The base III melts at 100° C., and the base IV at 120° C. under 0.01 Torr.

*Example 3*

To a solution of 15 grams of N-(β-diethylaminoethyl)-indole in 50 cc. of absolute ether are added in an atmosphere of nitrogen 70 cc. of a 1.2 N-solution of lithium n-butyl in absolute ether, and the whole is boiled under reflux for 3 hours. The mixture is then cooled to 5° C. and a solution of 11.2 grams of N-methyl-N-formyl-aniline in 40 cc. of absolute ether is added dropwise while stirring.

When the reaction mixture has been boiled under reflux for a further 3 hours, it is poured on to ice while stirring. The ethereal layer is washed with water, dried over magnesium sulfate, and evaporated on a water bath.

The residue is distilled in a high vacuum, whereby in addition to a small amount of forerunnings 11.5 grams of pure 1-(β-diethylaminoethyl)-indole-(2)-aldehyde boiling at 125–135° C. under 0.03 mm. pressure are obtained.

By adding to a solution of the above aldehyde in ethanol the calculated quantity of hydrochloric acid in ethyl acetate the hydrochloride is obtained, which melts with decomposition at 156–158° C. after recrystallization once from methanol.

By using, instead of N-(β-diethylaminoethyl)-indole, 18.3 grams of N-(β-benzyl-methylamino-ethyl)-indole, there are obtained in an analogous manner 12 grams of 1-(β-benzyl-methyl-amino-ethyl)-indole-(2)-aldehyde in the form of a brown oil boiling at 170–175° C. under 0.03 mm. pressure.

What is claimed is:

1. Process for the manufacture of substituted indole-2-aldehydes, wherein a 1-aliphatically substituted indole-(2)-lithium compound of the formula:

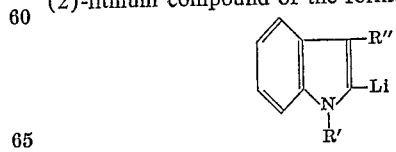

wherein R' is a member selected from the group consisting of lower alkyl, lower dialkylamino lower alkyl, and benzyl lower alkylamino lower alkyl and R'' is a member selected from the group consisting of hydrogen and lower dialkylamino lower alkyl, is condensed with an N-disubstituted formamide of the formula

wherein each of $R_1$ and $R_2$ represents a member selected from the group consisting of lower alkyl and phenyl, and the compound so formed is hydrolyzed.

2. Process as claimed in claim 1, wherein N-methyl-N-formylaniline is used as N-disubstituted formamide.

3. Process as claimed in claim 1, wherein 1-methyl-indole-(2)-lithium is used as starting material.

4. A 1-R'-3-R''-indole-(2)-aldehyde wherein at least one of the substituents R' and R'' represents lower dialkylamino lower alkyl and the other a member selected from the group consisting of hydrogen and lower alkyl.

5. 1-amino-lower alkyl-indole-(2)-aldehyde.

6. 1 - methyl-3-dimethylamino-methyl-indole-(2)-aldehyde.

7. 1-(β-diethylamino-ethyl)-indole-(2)-aldehyde.

8. An acid-addition salt of the compound of claim 5.

9. An acid-addition salt of the compound of claim 6.

10. An acid-addition salt of the compound of claim 7.

References Cited in the file of this patent

UNITED STATES PATENTS

| 2,414,715 | Britton | Jan. 21, 1947 |
| 2,775,593 | Behnisch et al. | Dec. 25, 1956 |

FOREIGN PATENTS

| 614,325 | Germany | June 6, 1935 |

OTHER REFERENCES

Wittig: Angewandte Chemie, vol. 53, pages 241–243 (1940).

Adams et al.: J. Amer. Chem. Soc., vol. 65, pages 360–3 (1943).

Heterocyclic Compounds, Elderfield, vol. 3, J. Wiley & Sons. N.Y., pp. 42–44 (1952).

Shirley et al.: Jour. A.C.S., vol. 75, pp. 375–378 (1953).

The Chemistry of Heterocyclic Compounds, Sumpter et al., Indole and Carbazole, Interscience Pub. Inc., N.Y., pp. 40–44 (1954).

Doyle et al.: J. Chem. Soc., pp. 2853–7 (1956).